United States Patent [19]

Larson et al.

[11] Patent Number: 4,630,259

[45] Date of Patent: Dec. 16, 1986

[54] LOCKUP DETECTION AND RECOVERY IN A PACKET SWITCHING NETWORK

[75] Inventors: Mikiel L. Larson, St. Charles; Wing N. Toy, Glen Ellyn; Avinash K. Vaidya, Naperville, all of Ill.

[73] Assignee: AT&T Bell Laboratories, Murray Hill, N.J.

[21] Appl. No.: 671,468

[22] Filed: Nov. 14, 1984

[51] Int. Cl.$^4$ ............................................ H04Q 11/04
[52] U.S. Cl. ........................................ 370/60; 370/13
[58] Field of Search ................... 370/60, 94, 13, 58; 340/825.5

[56] References Cited

U.S. PATENT DOCUMENTS

| | | | |
|---|---|---|---|
| 4,314,367 | 2/1982 | Bakka et al. | 370/60 |
| 4,511,958 | 4/1985 | Funk | 370/60 |
| 4,539,677 | 9/1985 | Lo | 370/94 |
| 4,546,467 | 10/1985 | Yamamoto | 320/13 |
| 4,584,679 | 4/1986 | Livingston et al. | 370/94 |

OTHER PUBLICATIONS

1979 Aug., Bolt Beranek and Newman, Inc., Report No. 4098, "Development of a Voice Funnel System".

*Primary Examiner*—Douglas W. Olms
*Assistant Examiner*—Frank M. Scutch, III
*Attorney, Agent, or Firm*—John C. Moran

[57] ABSTRACT

A self-routing packet switching network in which packets are communicated through stages of the network in response to self-contained addresses and in which a packet is discarded if a packet cannot be transferred to a subsequent stage of the network within a predefined amount of time. In addition, upon a packet being discarded, a maintenance message is transmitted over a maintenance channel to the processor controlling the network. Each network comprises stages of switching nodes which are responsive to the physical address in a packet to communicate the packet to a designated subsequent node. The nodes provide for variable packet buffering, packet address rotation techniques, and internode and intra-node signaling protocols. Each node comprises a timer which commences timing for a predefined amount of time upon receipt of a packet. If the timer times out, the packet is discarded and a maintenance message is transmitted to the processor controlling the network. The maintenance message includes the physical address plus an address identifying the network entry point of the packet. By discarding packets after a predefined amount of time, the problem of a self-routing network locking up is avoided when one switching node within the network fails or is experiencing overload traffic conditions.

16 Claims, 9 Drawing Figures

FIG. 2, FIG. 3, FIG. 4 show packet structures with the following fields (left to right): START BIT, PACKET LENGTH, DEST TRUNK CNTRLR, SOURCE TRUNK CNTRLR, CONTROL, ARRIVAL TIME, PACKET IDENTIFIER (1), LOGICAL ADDRESS, TIME STAMP (2), DATA, CRC.

FIG. 2: PACKET LENGTH = 110000, SOURCE TRUNK CNTRLR = 60, CONTROL = 0.

FIG. 3: PACKET LENGTH = 000011, SOURCE TRUNK CNTRLR = 60, CONTROL = 0.

FIG. 4: PACKET LENGTH = 001100, SOURCE TRUNK CNTRLR = 60, CONTROL = 0.

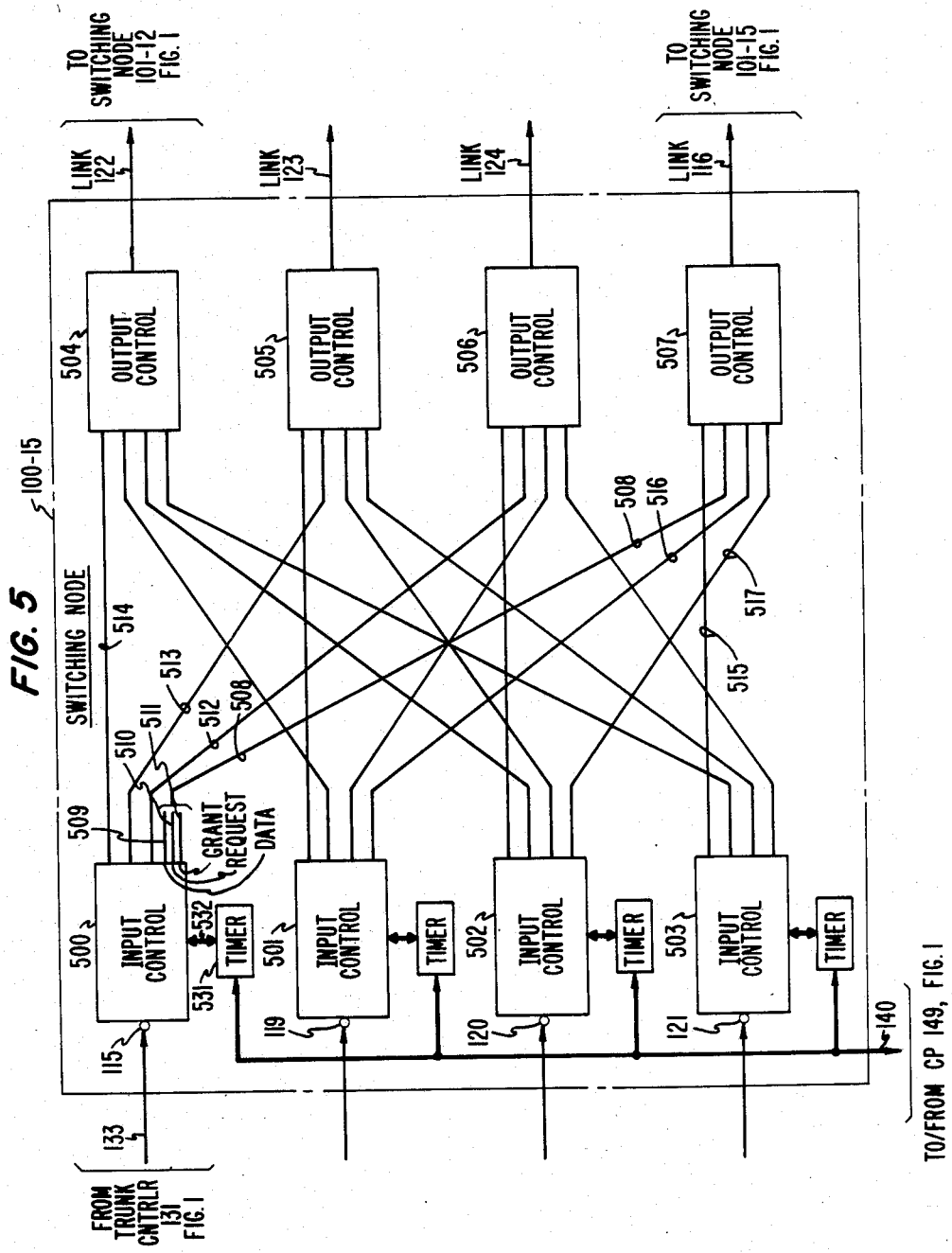

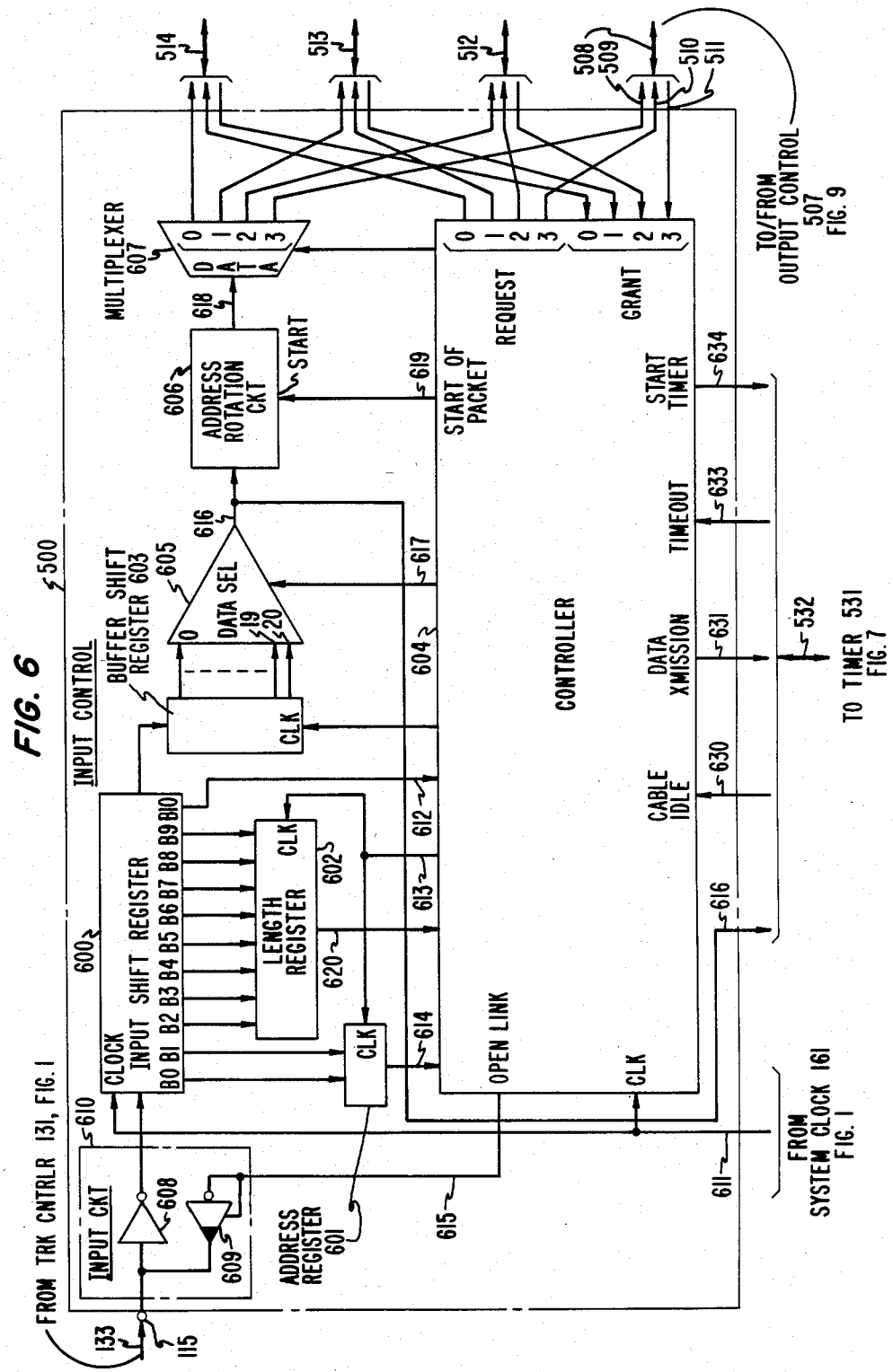

LOCKUP DETECTION AND RECOVERY IN A PACKET SWITCHING NETWORK

TECHNICAL FIELD

This invention relates to packet switching networks, and to a method and arrangement for detecting deadlock conditions in a packet switching network and clearing these conditions.

BACKGROUND OF THE INVENTION

The advantages of using a network comprising switching elements which route packets of data through the network on the basis of an address contained within the packet are well known. Such networks are commonly called binary routing networks. In this type of a network, there exists only one unique path between any two network terminations. Such a network comprises a plurality of stages each having a number of switching nodes with the stages being interconnected by means of links. Upon receipt of a packet, each switching node is responsive to the contents of an address field to attempt to route the packet to the next stage via an interconnecting link. The receiving switching node first determines if the destination switching node in the next stage is capable of receiving a packet. If the switching node in the next stage is unable to receive a packet because the node has failed or is experiencing heavy traffic conditions, the receiving node waits indefinitely. Because of this provision, it is possible in a network such as that disclosed in the Jonathan S. Turner, U.S. Pat. No. 4,491,945, for a lockup condition to occur where the receiving node waits indefinitely or for a substantially long period of time for the downstream node to be capable of accepting any packet.

The loss of one packet from a message is not a disastrous occurrence in most packet switching protocols in present use. When a packet is lost, this loss is detected, and the message is merely retransmitted. However, portions of the network being locked up impedes not only just one message, but can gradually cause the packet carrying capacity of the entire network to deteriorate as more and more nodes are unable to transmit buffered packets.

Therefore, there exists a need for efficiently clearing deadlock conditions and for detecting the occurrence of a deadlock condition within the switching network.

SUMMARY OF THE INVENTION

In an illustrative method and structural embodiment, a departure in the art is achieved by utilizing a timer to detect the presence of a deadlock condition and to cause the packet awaiting transmission to be discarded if a predefined amount of time is exceeded. In addition, if the latter occurs, the switching node transmits to the control processor associated with the switching network a message defining the location of the switching node performing the discard operation.

Advantageously, within a packet switching network, a packet switching node having a plurality of input terminals and output terminals is responsive to receipt of a packet on an input terminal for starting an internal timer counting for a predefined amount of time. In addition, the switching node is responsive to address information within the received packet to select one of the output terminals which in turn is connected to a downstream switching node. If the downstream switching node is capable of receiving a packet, the selected output terminal is in the idle condition, and the packet is communicated to the downstream node via the selected output terminal. If, on the other hand, the downstream node is not capable of accepting a packet before the internal timer times for the predefined amount of time, the switching node discards the packet.

In addition to discarding the packet, the switching node transmits to a control processor associated with the switching network a maintenance message indicating the fact that a packet has been discarded by the node. Also, in order to identify the switching node that did the discarding, the address information contained within the packet is included in the maintenance message thus allowing the control processor to identify the node and to execute the necessary maintenance functions to rectify the condition causing the discarding of the packet.

Also, in order to facilitate the communication of packets through the switching node, the latter is capable of variably storing the packet and immediately commencing the communication of the packet to the selected one of the output terminals upon the latter being idle. Furthermore, if the predefined amount of time elapses before the selected one of the output terminals becomes idle, the switching node accesses the variable buffer, verifies that the maintenance channel is idle, and then transmits the address information of the packet to the control processor via the maintenance channel.

These and other advantages and features of the present invention will become apparent from the following description of an illustrative embodiment of the invention taken together with the drawing.

BRIEF DESCRIPTION OF THE DRAWING

FIGS. 2 through 4 illustrate the contents of a packet as the packet progresses through the different stages of the switching network of FIG. 1;

FIG. 5 is a detailed block diagram of switching node 100-15 of the switching network;

FIG. 6 is a detailed block diagram of input control 500 of switching node 100-15;

DETAILED DESCRIPTION

Figure 1:
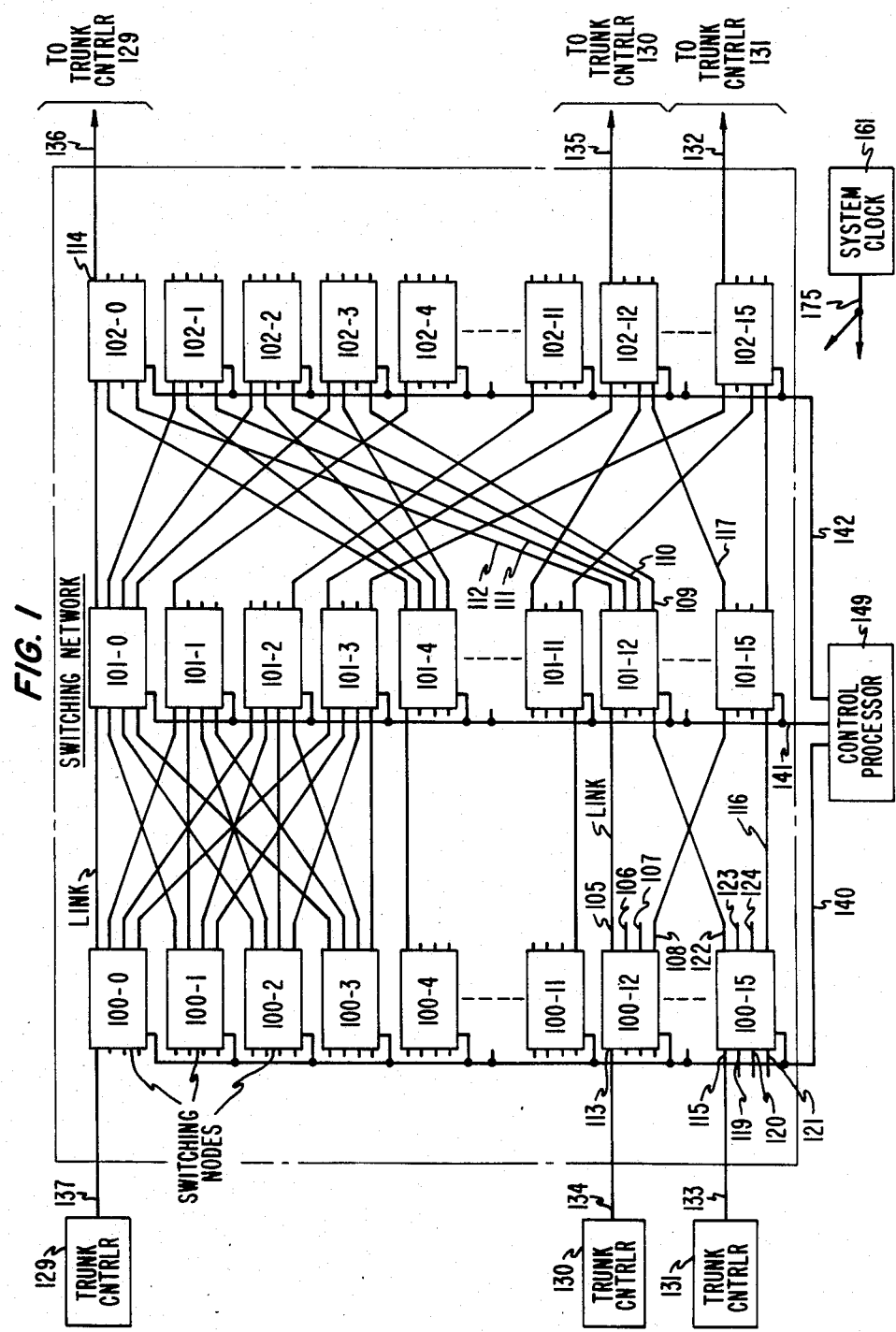
FIG. 1 is a detailed block diagram of a switching network.

FIG. 1 shows an illustrative, self-routing packet switching network for interconnecting a plurality of trunk controllers with each trunk controller being connected to a high-speed digital trunk that is not illustrated. The manner of utilizing a packet switching network such as illustrated in FIG. 1, is disclosed in the previously mentioned J. S. Turner U.S. Pat. No. 4,491,945, which is hereby incorporated by reference. The Turner patent discloses the details for the initialization of trunk controllers such as trunk controllers 129 through 131 to configure these trunk controllers for the transmission of packets through the system. A trunk controller, such as trunk controller 131 is responsive to a packet received on an attached high-speed digital trunk to incorporate the received packet into a switch packet that is then communicated via the switching network of FIG. 1 to another trunk controller, such as trunk controller 131. The receiving trunk controller then reformats a packet for transmission on its attached high-speed digital trunk. Each of the nodes illustrated in the switching network is responsive to receipt of a switch packet to buffer this packet, determine the downstream switching node that the packet is to be next communicated to, and retransmit the switch packet to the downstream node when the downstream node is capable of receiving packet. If the downstream node has failed or is experiencing heavy traffic condition and does not become available for reception of the switch packet, the switching node awaiting transmission discards the switch packet after a predefined amount of time. Upon discarding the switch packet, the switching node transmits information identifying that switching node via a serial communication channel such as bus 140 to control processor 149. The latter then takes appropriate maintenance steps to resolve the high-traffic or failing condition within the switching network.

The network illustratively comprises three stages of switching nodes. The first stage comprises switching nodes 100-0 through 100-15, the second stage comprises switching nodes 101-0 through 101-15, and the third stage comprises switching nodes 102-0 through 102-15. Transmission through the network is from left to right. Each switching node is a packet switch. Each packet switch has four inputs and is capable of buffering one packet on each input. The packets received on any input are transmittable on any of the four output terminals of the packet switch. After receipt of a packet on an input terminal, the network address, also referred to as destination trunk controller field, contained in that packet is used to determine which output terminal should be used to retransmit the packet. Only the two most significant bits of the address are used to designate the output terminal for a particular switching node. For example, switching node 100-12 retransmits the packet on link 105 if the two most significant bits are equal to a value of zero, on link 106 if the two most significant bits are equal to a value of one, on link 107 if the two most significant bits are equal to a value of two, and on link 108, if the two most significant bits are equal to a value of three.

Each node properly rearranges the address bits so that the receiving switching node in the next stage has the correct bits in the most significant bit positions in order to determine which output terminal should be used to retransmit the packet at that stage.

An example will be used to help illustrate the operation of the switching network as shown in FIG. 1. This will be done by following the transmission of a packet received from a digital trunk through the switching network from trunk controller 131 to trunk controller 130. Upon receipt of the packet from the attached digital trunk, trunk controller 131 forms the packet shown in FIG. 2. After forming this packet, trunk controller 131 transmits this packet to switching node 100-15 via input terminal 115. Switching node 100-15 examines the two most significant bits of the destination trunk controller field (in this example a binary three), and selects link 116 to transmit the packet shown in FIG. 2. Then, switching node 100-15 performs a left rotate operation on the destination trunk controller field, and the result is the packet shown in FIG. 3. Before switching node 100-15 starts to transmit the packet via link 116, it waits until switching node 101-15 is capable of storing another packet. If switching node 100-15 has to wait longer than a predefined period of time, switching node 100-15 discards the packet and transmits the source and destination trunk controller fields illustrated in FIG. 2 to central processor 149 via cable 140. Upon receiving the packet from switching node 100-15, switching node 101-15 examines the two most significant bits of the destination trunk controller field as shown in FIG. 3 and selects output 117 to transmit the packet out. Then, switching node 101-15 performs a left rotate operation on the destination trunk controller, resulting in the packet shown in FIG. 4. Before transmitting the packet, switching node 101-15 waits until switching node 102-12 is capable of storing another packet. Again, if the wait period exceeds a predetermined amount of time, switching node 101-15 discards the packet and notifies control processor 149 via cable 141 by transmission of the source and destination controller fields illustrated in FIG. 3. Upon receiving the packet of FIG. 4, switching node 102-12 responds to the destination trunk controller field by transmitting the packet to trunk controller 130 via conductor 135. Switching node 102-12 also performs the left rotate operation on the destination trunk controller field. Switching node 102-12 waits until trunk controller 130 is capable of receiving the packet. Again, if this waiting time exceeds the predefined amount of time, the packet is discarded and control processor 149 is notified via cable 142 by the transmission of the source and destination controller fields illustrated in FIG. 4. The packet that is transmitted to trunk controller 130 via conductor 135 is similar to the packet shown in FIG. 4 with the destination trunk controller field rotated. Trunk controller 130 forms a new packet for transmission on a digital trunk and retransmits this new packet on the attached digital trunk. The forming of the new trunk packet is described in detail in the previously referenced Turner application.

Switching node 100-15 is illustrated in greater detail in FIG. 5. The other switching nodes are identical in design to switching node 100-15. The switching node consists of four input controls which can transmit information to any one of four output controls. The input controls 500 through 503 are connected to the output controls 504 through 507 via cables. For example, input control 500 is connected to output control 507 via cable 508. Cable 508 comprises three conductors 509, 510, and 511. The other interconnecting cables on FIG. 5 are identical in design to cable 508.

When input control 500 has a packet to transmit to output control 507, it transmits a request signal via conductor 510 to output control 507 and a timer start signal via cable 532 to timer 531. Input control 500 continuously transmits this request signal until the entire packet has been transmitted to output control 507 or receipt of the timeout signal via cable 532 from timer 531. When output control 507 is free to receive information from input control 500, output control 507 transmits a grant signal via conductor 511 to input control 500. Upon receipt of the grant signal, input control 500 commences to transmit the packet to output control 507 via conductor 509 and resets timer 531. If timer 531 times out, it transmits the timeout signal via cable 532 to input control 500. The latter is responsive to the timeout signal to discard the packet and to transmit the source and destination trunk controller fields to control processor 149 via timer 531 and cable 140.

For example, the packet shown in FIG. 2 would be transmitted through switching node 100-15 as illustrated in FIG. 5 in the following manner. When input control 500 recognizes the start bit, it has already received not only the start bit but also the two most significant bits of the destination trunk controller field. Input control 500 decodes the two most significant bits of the destination trunk controller field and determines that the packet was to be transmitted to output control 507 via cable 508. Input control 500 requests permission to start transmission via conductor 510; and when output control 507 returns the grant signal via conductor 511, input control 500 starts the transmission of the packet to output control 507 via cable 508. Before transmitting the destination trunk controller field, input control 500 left rotates this field two bits so that the destination trunk controller field transmitted is that shown in FIG. 3. Upon receipt of the start bit of the packet, output control 507 starts to retransmit this packet out on link 116.

Input control 500 of FIG. 5 is shown in greater detail in FIG. 6. Input circuit 610 receives the information from input terminal 115 and transmits to trunk controller 131 the link open signal via input terminal 115 under control of controller 604 which is implemented using well known finite state machine techniques. The function of the link open signal will be explained in a later section describing output control 507. Input shift register 600 is used to detect the start bit, which indicates the beginning of a packet. Controller 604 is responsive to detection of the start bit to transmit the start timer signal to timer 531. In addition, input shift register 600 is used to extract the network packet length field, which is saved in length register 602, and to extract the two most significant bits of the destination trunk controller field, which are saved in address register 601.

The buffer shift register 603 is capable of buffering one complete packet. Buffer shift register 603 provides an output after each 64 bits of storage. These outputs can be selected by data selector 605 under control of controller 604 to bypass unused portions of the buffer shifter register 603. This bypassing is done when it is not necessary to buffer a whole packet before transmission of the packet can start to the output circuit and is done to speed up the transfer of a packet through input control 500. Address rotation circuit 606 performs the previously mentioned left rotate operation on the destination trunk controller field before this field is transmitted with the remainder of the packet to the selected output control. Multiplexer 607 under control of controller 604 selects which of the cables 508, 512, 513, or 514 the data is to be transmitted on.

Figure 7:
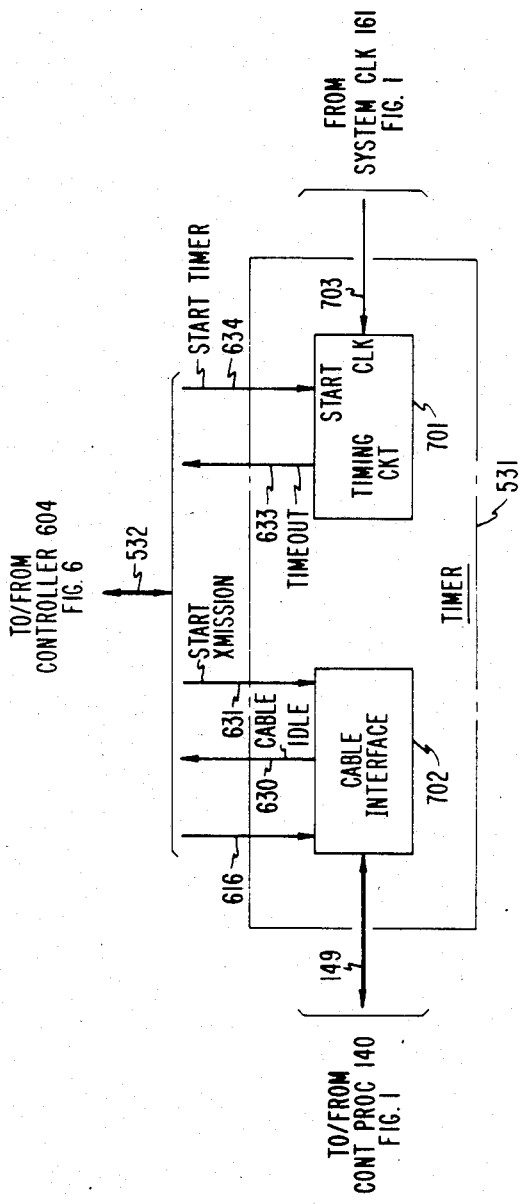
FIG. 7 is a detailed block diagram of timer 531 of FIG. 5.

Controller 604 is responsive to the timeout signal from timer 531 to determine if cable 140 is idle by testing for the cable idle signal on conductor 630 from timer 531 which is illustrated in FIG. 7. If the latter signal is present, controller 604 extracts the source and destination trunk controller fields from buffer shift register 603, transfers these fields to timer 531 via cable 532, and transmits the start transmission signal via conductor 631 to timer 531. In response to the start transmission signal, timer 531 transfers the source and destination fields to processor 149 via cable 140.

The operation of input control 500, assuming that timer 531 does not timeout, will now be further explained by using the previous example which dealt with the transmission of the packet shown in FIG. 2. Input shift register 600 is continuously being clocked by system clock 161 via conductor 611. As data is received via input terminal 115, it is clocked through input shift register 600. Once the start bit reaches bit position 10 of input shift register 600, controller 604 detects this bit and transmits a pulse on conductor 613 and the start timer signal via conductor 634 to timer 531. The pulse on conductor 613 causes length register 602 to store the network packet length field, and causes address register 601 to store the two most significant bits of the destination trunk controller field, which are contained in bit positions 0 and 1 of input shift register 600.

Controller 604 transmits a request via conductor 510 to output control 507 since the most significant address bits indicate that the packet is to be transmitted to this output control. While this request is being made, data is being shifted from input shift register 600 to buffer shift register 603 which has a number of output terminals. These output terminals are connected to different bit positions within buffer shift register 603. When controller 604 receives a grant signal from output control 507 via conductor 511, controller 604 calculates at which output of buffer shift register 603 the start bit of the packet is approaching within buffer shift register 603. This is done so that transmission of the packet to output control 507 can start as soon as possible. Note, that controller 604 is further responsive to the grant signal to stop transmitting the start timer signal to timer 531 causing timer 531 to be reset. On the basis of this calculation, controller 604 controls data selector 605 to select the designated output of buffer shift register 603. The control information is transmitted to data selector 605 via cable 617. Data selector 605 transmits the data from the selected output to address rotation circuit 606 via conductor 616. Before transmitting data, controller 604 resets address rotation circuit 606 by transmitting the start of a packet signal via conductor 619. The controller 604 then uses the packet length information stored in length register 602, which it reads via cable 620, to determine when the end of the packet has entered the input shift register. When this occurs and transmission has started from shift register 603, controller 604 transmits the link open signal via conductor 615. This signal is retransmitted via tri-state driver 609 and input terminal 115 to trunk controller 131. The link open signal indicates that input control 500 is now ready to receive another packet. This function is explained in the section dealing with the output control circuit.

The operation of input control 500 will now be further explained using the previous example and assuming that timer 531 does timeout. As previously described, controller 604 decodes the address bits, starts timer 531, transmits the request signal to output control 507, and waits for the grant signal from the output control 507. Upon receipt of the timeout signal from timer 531, controller 604 removes the request signal to output control circuit 507 and interrogates conductor 630 for the cable idle signal which indicates that cable 140 is capable of transmitting a message to processor 149. Upon receipt of the cable idle signal, controller 604 calculates at which output of buffer shift register 603 the start bit of the packet is approaching within buffer shift register 603. On the basis of the calculation, controller 604 controls data selector 605 to select the designated output of buffer shift register 603. The control information is transmitted to data selector 605 via cable 617. Data selector 605 transmits the data from the selected output via conductor 616 to timer circuit 531. When the destination trunk controller field information is present on conductor 616, controller 604 transmits the start transmission signal via conductor 631 to timer 531 and continues to transmit the latter signal as long as source or destination trunk controller field information is present on conductor 616. In response to the start transmission signal, timer 531 transmits the data on conductor 616 via cable 140 to processor 149. When the source trunk controller field is no longer present on conductor 616, controller 604 removes the start transmission signal. Removal of the latter signal terminates transmission on cable 140 by timer 531. Controller 604 continues to clock information out of buffer shift register 603 until the packet has been removed from buffer shift register 603. This process results in the packet being discarded.

Timer 531 is shown in greater detail in FIG. 7. Timing circuit 701 is responsive to the start timer signal transmitted via conductor 634 and clock signals from system clock 161 transmitted via conductor 703 to time for a predetermined period of time. After the predetermined period of time has been reached, timing circuit 701 transmits the timeout signal to controller 604 via conductor 633. If during this predetermined period of time, controller 604 removes the start timer signal from conductor 634, timing circuit 701 is reset.

Cable interface 702 may be any well-known serial cable interface for interconnecting to a serial cable shared by a plurality of devices. Cable interface 702 continuously monitors the stated cable 140; and when cable 140 is idle, cable interface 702 transmits the cable idle signal to controller 604 via conductor 630. Cable interface 702 is responsive to the start transmission signal transmitted via cable 631 to transfer data present on conductor 616 to cable 140 so long as the start transmission signal is present on conductor 631.

Figure 8:
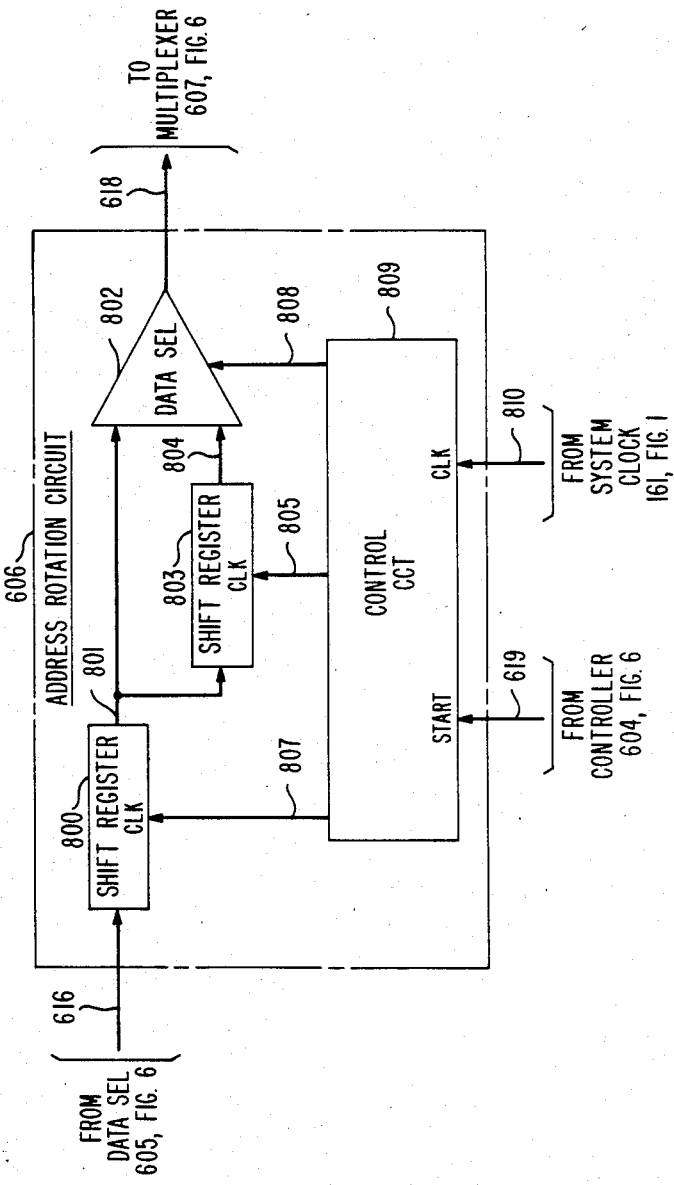
FIG. 8 is a detailed block diagram of address rotation circuit 606 of input control 500.

Address rotation circuit 606 is illustrated in greater detail in FIG. 8. The purpose of circuit 606 is to rotate the destination field to the left two bits so that the two most significant bits become the least significant bits. The rotation is necessary because each input control decodes only the two most significant bits. Shift registers 800 and 803 are two bit shift registers, data selector 802 is used to select either the output of shift register 800 or shift register 803, and control circuit 809 controls the operation of the address rotation circuit. When control circuit 809 receives the start of packet signal from controller 604 via conductor 619, it transmits a clock signal to shift register 800 via conductor 807, and to shift register 803 via conductor 805. This clock signal is derived from the signal received from system clock 161 via conductor 810. Control circuit 809 conditions data selector 802 via conductor 808 to select shift register 803's output to be transmitted on conductor 618. Control circuit 809 then counts the number of bits that are being transmitted via conductor 618; when the two most significant bits of the destination trunk controller field are contained within shift register 803, control circuit 809 ceases to transmit the clock signal to shift register 803 via conductor 805, and conditions data selector 802 to select the output of shift register 800. Control circuit 809 then waits until the remaining bits of the destination trunk controller field have been transmitted via conductor 618. At this point in time, control circuit 809 commences to send clock signals to shift register 803, and conditions data selector 802 to select the output of shift register 803. This operation results in the most significant bits of the destination trunk controller field being rotated.

Figure 9:
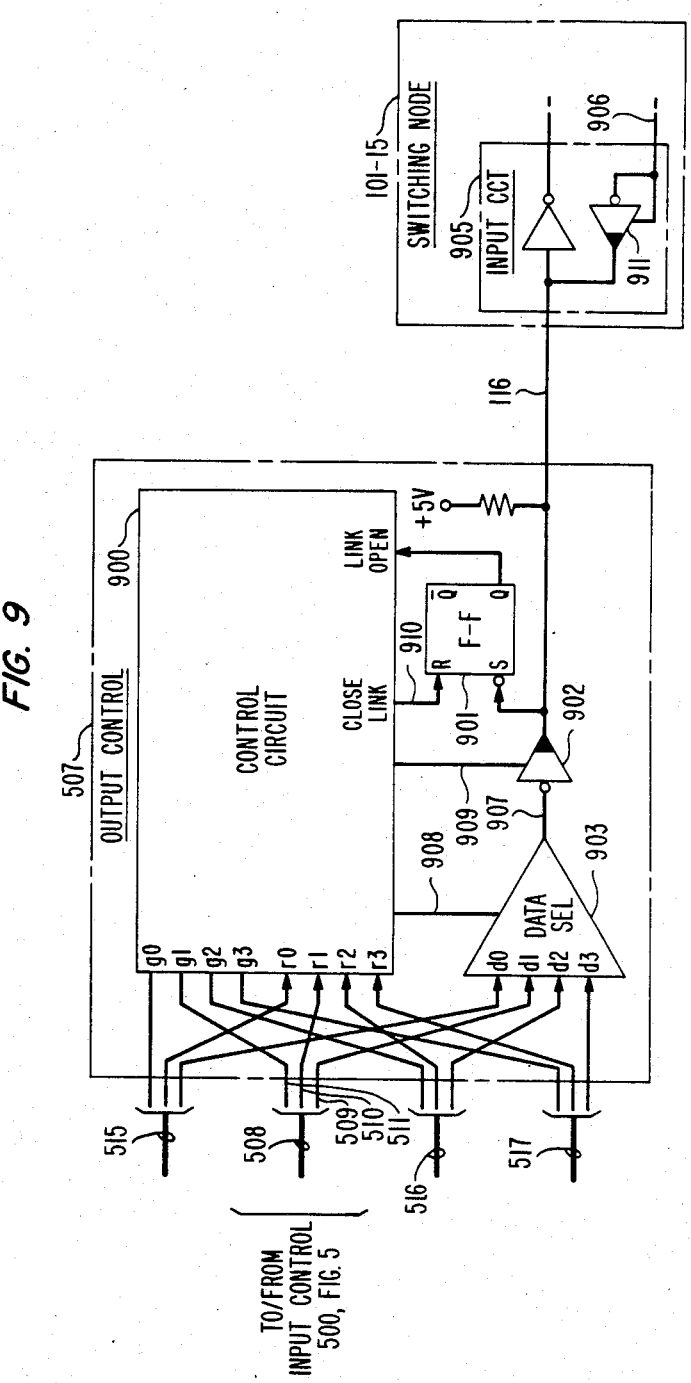
FIG. 9 is a detailed block diagram of output control 507 of switching node 100-15.

Output control 507 is shown in greater detail in FIG. 9. Control circuit 900 responds to requests from input controls 500 through 503, which are transmitted via cables 508, 515, 516, and 517. If flip-flop 901 is set, control circuit 900 responds to the request by transmitting a grant signal back to the requesting input control via one of the above-mentioned cables. After transmission of the grant signal, control circuit 900 ignores the state of flip-flop 901 until the entire packet has been transferred. After acknowledging the request, control circuit 900 conditions data selector 903 to select the data conductor from the appropriate cable 508, 515, 516, or 517. Control circuit 900 transmits the appropriate control information to data selector 903 via cable 908. Data selector 903 transfers the data information received on the selected input terminal to conductor 907. Tri-state device 902 takes the information on conductor 907 and transmits this data via link 116 to input circuit 905, which is part of switching node 101-15. Control circuit 900 controls the output of tri-state device 902 via conductor 909.

The operation of output control 507 as shown in FIG. 9 will be explained in greater detail by considering the previous example of input control 500 transmitting a packet of data to output control 507 via cable 508. When input control 500 transmits the request signal via conductor 510, control circuit 900 transmits the grant signal to input control 500 via conductor 511 if the link 116 is not being used by one of the other input control circuits and the output of flip-flop 901 is set. Assuming that flip-flop 901 was set, control circuit 900 transmits the grant signal to input control 500 and conditions data selector 903 via cable 908 to select the data being transmitted on conductor 509 and retransmits this data on conductor 907. In addition, control circuit 900 enables the tri-state device 902 to transfer the information on conductor 907 to link 116.

After input control 500 has transmitted the entire packet, it removes the request signal from conductor 510. Once the request signal is removed from conductor 510, control circuit 900 sends a reset signal to flip-flop 901 via conductor 910 and stops transmitting signals via cable 908 and conductor 909. In the absence of the request signal, control circuit 900 ignores all data from input control 500. Once the input control of the switching node 101-15 is capable of accepting another packet, it transmits the open link signal via conductor 906, tri-state device 911, and link 116. The open link signal sets flip-flop 901 via the S input. Once flip-flop 901 is set, control circuit 900 can once again respond to request signals from the input controls.

It is to be understood that the above-described embodiment is merely illustrative of the principles of the invention and that other arrangements may be devised by those skilled in the art without departing from the spirit and the scope of the invention.

What is claimed is:

1. A packet switching node comprising:
a plurality of input terminals;
a plurality if output terminals;
means responsive to receipt of a packet on one of said input terminals for generating a timer start signal;
timer means responsive to said timer start signal for transmitting a timer completion signal after a predetermined amount of time;
means responsive to address information in said packet for selecting one of said output terminals;
means responsive to said timer completion signal for discarding said packet; and
means responsive to an idle condition of said selected output terminal for communicating said packet to said selected output terminal.

2. The packet switching node of claim 1 further comprises transmission means for communication of a maintenance message indicating that said packet has been discarded; and said discarding means further responsive to said timer completion signal for transmitting said maintenance message via said transmission means upon said transmission means being idle.

3. The packet switching node of claim 2 wherein said maintenance message comprises address information for identifying said switching node.

4. The packet switching node of claim 3 further comprising means for variably storing said packet;

means responsive to said selected one of said output terminals being idle for transmitting a control signal;

means responsive to receipt of said control signal indicating said idle condition of said selected one of said output terminals for immediately commencing the communication of said packet to said selected one of said output terminals; and means responsive to said timer completion signal for selecting said address information of said packet for transmission on said transmission means upon transmission means being idle.

5. A packet switching network comprising:
a plurality of input conductors;
a plurality of output conductors;
a plurality of switching nodes interposed between said plurality of input and output conductors;
processor means for controlling the administration of said switching network;
transmission means for the communication of maintenance messages between said plurality of switching nodes and said processor means;
each of said nodes comprising:
means responsive to a packet received from one of said input conductors for discarding said packet upon a predefined amount of time elapsing and the inability to route said packet to one of said output conductors designated by address bits within said packet; and
means responsive to the elapse of said predefined amount of time for transmitting one of said maintenance messages defining the position of said receiving node in said switching network.

6. The switching network of claim 5 further comprises means responsive to said address bits and the ability to route said packet to the designated one of said output conductors for routing said packet to said designated one of said output conductors.

7. The packet switching network of claim 6 wherein said maintenance message comprises said address bits thereby identifying said switching node.

8. The switching network of claim 6 wherein each of said nodes comprises means for variably storing said packet;

means responsive to said designated one of said output conductors being capable of transmitting said packet for transmitting a control signal;

means responsive to receipt of said control signal for immediately commencing the communication of said packet to said designated one of said output conductors; and means responsive to said timer completion signal for selecting said address information of said packet for transmission on said transmission means upon said transmission means being idle.

9. An arrangement for the identification of a switching node within a self-routing network for communicating packets each containing an address field for routing the packet through said switching network, said arrangement comprising:

means for detecting a fault condition affecting the communication of one of said packets;

means responsive to detecting of said fault condition for discarding said one of said packets; and means for transmitting a maintenance message containing said address information thereby identifying said switching node upon said one of said packets being discarded.

10. The arrangement of claim 9 wherein each of said packets further comprises source address information defining the entry point of the packet into said switching network and said maintenance message further comprises said source address information.

11. A self-routing packet switching system comprising:
a plurality of input conductors;
a plurality of output conductors;
a plurality of switching nodes interposed between said plurality of input and output conductors;
processor means for controlling the adminstration of said switching network;
transmission means for the communication of maintenance messages between said plurality of switching nodes and said processor means;
each of said nodes comprising:
means for detecting fault conditions associated with the communication of a packet received on one of said input conductors to one of said output conductors;
means responsive to detection of one of said fault conditions for discarding said packet; and
means for transmitting one of said maintenance messages comprising address signals included in said packet defining the route through said switching network upon said packet being discarded and said transmission means being available.

12. The packet switching network of claim 11 wherein said packet further comprises source address signals defining the entry point of said packet into said switching network and said maintenance message further comprises said source address signals.

13. A method of switching packets of digital signals between a plurality of input terminals and a plurality of output terminals via a switching node comprising a plurality of input control means each of which is connected to an individual one of said input terminals, a plurality of output control means each of which is connected to an individual one of said output terminals, means individually connecting each of said input control means to each of said output control means, timer means for calculating a predefined amount of time, transmission means for transmission of maintenance messages, and each of said packets comprising an address field defining the communication path from an individual one of said input control means over said connecting means and an individual one of said output control means to said individual one of said output terminals connected thereto, and said method comprises the steps of:

designating an individual one of said output control means in response to the receipt of the address field of one of said packets;

transmitting a request signal over said connecting means to said designated individual one of said output control means;

transmitting a timer start signal to said timer means for calculating said predetermined amount of time in response to receipt of said one of said packets;

transmitting a grant signal to said receiving one of said input control means by said designated output control means in response to said request signal to signify the packet communication availability of said output control means and said individual one of said output terminals connected thereto;

resetting said timer means in response to said grant signal from said designated one of said output control means; and transmitting the received packet to said output control means by said input control means in response to said grant signal.

14. The method of claim 13 further comprises the step of discarding said packet upon the elapse of said predefined amount of time and the absence of said grant signal from said designated output control means.

15. The method of claim 14 further comprises the steps of generating a timer completion signal upon said elapse of said predefined amount of time; and communicating one of said maintenance messages via said transmission means upon said transmission means being idle and generation of said timer completion signals.

16. The method of claim 15 wherein each of said packets further comprises a source address field defining the network entry point of each of said packets said step of communicating said one of said maintenance messages further comprises the step of inserting the contents of said address field and the source address field into said maintenance message thereby identifying said switching node.

* * * * *